United States Patent
De Boer

(10) Patent No.: US 9,541,067 B2
(45) Date of Patent: Jan. 10, 2017

(54) METHOD FOR OPERATING A WIND TURBINE OR A WIND FARM

(71) Applicant: WOBBEN PROPERTIES GMBH, Aurich (DE)

(72) Inventor: Joachim De Boer, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 133 days.

(21) Appl. No.: 14/364,650

(22) PCT Filed: Dec. 10, 2012

(86) PCT No.: PCT/EP2012/074900
§ 371 (c)(1),
(2) Date: Jun. 11, 2014

(87) PCT Pub. No.: WO2013/087553
PCT Pub. Date: Jun. 20, 2013

(65) Prior Publication Data
US 2014/0352311 A1 Dec. 4, 2014

(30) Foreign Application Priority Data

Dec. 12, 2011 (DE) .................. 10 2011 088 313

(51) Int. Cl.
*F03D 9/00* (2016.01)
*F03D 7/04* (2006.01)

(52) U.S. Cl.
CPC .............. *F03D 9/005* (2013.01); *F03D 7/048* (2013.01); *F03D 9/10* (2016.05); *F05B 2220/61* (2013.01);
(Continued)

(58) Field of Classification Search
CPC ............ F03D 9/005; F03D 7/048; F03D 9/02; Y02E 10/721; Y02E 10/723; Y02E 70/10; F05B 2220/61; F05B 2240/96; F05B 2270/404; F05B 2270/1033
(Continued)

(56) References Cited

U.S. PATENT DOCUMENTS 7,934,905 B2 * 5/2011 Eggleston ............... F03D 7/042
119/718
7,983,844 B2 * 7/2011 Beach ....................... F03D 1/00
290/44

(Continued)

FOREIGN PATENT DOCUMENTS

BY 5592 C1 12/2003
DE 27 51 341 A1 5/1979
(Continued)

OTHER PUBLICATIONS

Heier, S., "Wind Turbines. System design, integration and regulation," Stuttgart, Teubner 3rd Ed. 2003, pp. 113-115, ISBN 3-519-26171-5 (with machine translation).
(Continued)

*Primary Examiner* — Hoang Nguyen
(74) *Attorney, Agent, or Firm* — Seed IP Law Group LLP

(57) ABSTRACT

Thus, a method for operating a wind turbine, a wind farm or the like and a power-to-gas unit connected electrically thereto is provided. The wind turbine or the wind farm generates electric power if there is sufficient wind and feeds this power into an electrical grid connected to the wind turbine or to the wind farm. Each wind turbine is operated with a predetermined power curve. Electric power is generated by the wind turbine or the wind farm once a first wind speed (starting wind) has been reached. The wind turbine or the wind farm is in a partial-load operating mode as long as the wind speed is between the first wind speed (starting wind) and a second wind speed (nominal wind). The wind turbine or the wind farm is in a nominal power range when
(Continued)

the wind speed is in a range which is greater than the second wind speed (nominal wind speed). Electric power generated by the wind turbine or the wind farm, preferably at least a predetermined proportion of said power, is consumed in the power-to-gas unit, with the result that a combustible gas, in particular hydrogen and/or methane gas or the like, is generated in the power-to-gas unit. The proportion of the electric power which is generated by the wind turbine or the wind farm in the partial-load operating mode and is not consumed in the power-to-gas unit is set to be virtually constant for a predetermined time segment, for example 10 minutes or more, for example 1 hour.

16 Claims, 4 Drawing Sheets

(52) U.S. Cl.
CPC .... *F05B 2240/96* (2013.01); *F05B 2270/1033* (2013.01); *F05B 2270/404* (2013.01); *Y02E 10/721* (2013.01); *Y02E 10/723* (2013.01); *Y02E 70/10* (2013.01)

(58) Field of Classification Search
USPC .................. 60/698, 706, 719; 290/44, 55
See application file for complete search history.

(56) References Cited

U.S. PATENT DOCUMENTS

| | | | | |
|---|---|---|---|---|
| 8,283,803 | B2 * | 10/2012 | Fortmann | H02J 3/383 290/44 |
| 8,288,888 | B2 * | 10/2012 | Hinatsu | C25B 15/02 307/24 |
| 8,332,077 | B2 * | 12/2012 | Kondo | F03D 7/047 290/44 |
| 2004/0267466 | A1 | 12/2004 | Enis et al. | |

FOREIGN PATENT DOCUMENTS

| | | |
|---|---|---|
| DE | 197 16 645 A1 | 10/1998 |
| EP | 1 596 052 A1 | 11/2005 |
| EP | 1 739 824 A2 | 1/2007 |
| GB | 2 263 734 A | 8/1993 |
| JP | 2007-56686 A | 3/2007 |
| RU | 2 015 412 C1 | 6/1994 |
| RU | 77948 U1 | 11/2008 |
| WO | 2009/065577 A1 | 5/2009 |
| WO | 2010/048706 A1 | 5/2010 |

OTHER PUBLICATIONS

Mantz, R.J. et al., "Hydrogen production from idle generation capacity of wind turbines," International Journal of Hydrogen Energy, vol. 33 Nr., Aug. 16, 2008, pp. 4291-4300.

* cited by examiner

METHOD FOR OPERATING A WIND TURBINE OR A WIND FARM

BACKGROUND

Technical Field

Wind turbines or wind farms comprising a multiplicity of wind turbines have long been known in a wide variety of forms, embodiments, sizes and variants.

Description of the Related Art

A wind turbine is an installation which transforms energy which is available in the wind into electrical energy by conversion. This electrical energy is primarily fed into an electric grid.

The known disadvantage of wind energy consists in that it fluctuates with the wind, i.e., the electrical energy generated by the wind turbine can fluctuate depending on the present wind speed. However, this strictly speaking only applies in the partial-load range, i.e., in the range of the wind turbine between a first wind speed (starting wind) and a second wind speed (nominal wind). That is to say that if the wind strength is greater than the nominal wind speed, fluctuations in the wind speed which are above the nominal wind speed do not result in any fluctuations in the generation of the electrical energy because the wind turbine is controlled, for example by setting the rotor blades of the wind turbine, in such a way that the rotation speed and/or the electric power generated remains virtually constant.

However, if a wind turbine is in the partial-load range for the majority of its operation and in this partial-load range the generated electric power of the wind turbine also fluctuates directly with the wind speed, fluctuating power, i.e., a fluctuating absolute value of the electric power (namely the active power), is also constantly fed into the grid with fluctuating wind speed.

Thus, wind turbines fail in terms of many considerations with respect to grid management as generators for a base load because it is not possible to predict with sufficient probability the power input of the wind turbine to the grid.

It would indeed now be theoretically possible to run a wind turbine suboptimally, for example not running the wind turbine at the maximum power in the partial-load range, but to operate it with a suboptimal power output such that, in the event of fluctuations in wind speed in the partial-load range, the rotor blades of the wind turbine are actuated in such a way that the fluctuation in the wind speed is compensated for and thus the wind turbine feeds a virtually constant power input into the grid.

The disadvantage of such a solution consists, however, in that even in the partial-load range of the wind turbine, the wind energy output of the wind turbine then consistently needs to be readjusted, for example by pitching the rotor blades or by actuating a suitable generator countertorque or a corresponding other measure, which firstly additionally costs energy for the operation of a wind turbine and secondly also continuously uses the corresponding component parts such that ageing and wear of said component parts is accelerated.

However, primarily valuable inputs of power are lost in the case of such an operating procedure and thus the entire wind turbine will only have a relatively low level of efficiency.

The German Patent and Trademark Office has searched the following prior art in the priority application with respect to the present application: DE 27 51 341 A1, GB 2 263 734 A, DE 197 16 645 A1 and US 2004/0267466 A1. Finally, reference is also made to EP 1 739 824 A2 and WO 2010/048706 A1 as further prior art. EP 1 739 824 proposes (see FIG. 6 therein) that for the case where, in the partial-load operating mode, the wind farm power increases, the power of the wind farm which is fed into the grid does not increase as much as the wind farm power, but the increase in the power fed into the grid is made more uniform by the controlled use of an electrolysis device.

BRIEF SUMMARY

One or more embodiments of the present invention are directed to stabilizing the electric power output by the wind turbines to the grid One embodiment of present invention proposes new ways in which the desire for stabilization of the electric power of a wind turbine can be implemented in practice. In this respect, a wind turbine or a wind farm (comprising a multiplicity of wind turbines) can be operated together with a power-to-gas unit. The power-to-gas unit converts, for example, electric power into a fuel gas (hydrogen, methane etc.).

It is clear that the forecast for the output of electric power of a wind turbine cannot be predicted safely for all times since the wind will continue to fluctuate and fluctuates at very different times of day, fluctuates at very different times of year, and it is therefore primarily relevant for a reliable forecast time period to be selected and for the power fed into the grid within this forecast time period to have the desired value (forecast power), but in any case for this value not to be undershot.

In this case, it is firstly to begin with not relevant whether the total electric power of the wind turbine or the wind farm is fed into the grid, but the wind turbine or the wind farm, on the one hand, and the power-to-gas unit, on the other hand, need to be considered as an entire unit from the grid side.

That is to say that it is ultimately relevant what electric power is made available to the consumers which are connected to the grid, and even when the power-to-gas unit is connected to the grid, in this consideration it is not considered to be a conventional consumer, but a tool by means of which the electric power which is made available to the grid by the wind turbine or the wind farm can be kept constant.

It is therefore also irrelevant whether the electric power which is drawn by the power-to-gas unit is drawn from the electrical intermediate circuit of a wind turbine or directly from the output of the wind turbine or from the output of a wind farm or the power is first drawn from the grid if previously the total power of the wind turbine or the wind farm has been fed into the grid.

Ultimately it is only electric power which is fed into the grid and is not consumed by the power-to-gas unit that is of relevance for the grid. If this electric power, also referred to as "forecast power" or "base load", is (virtually) constant, the unit comprising the wind turbine and the power-to-gas unit is therefore capable of feeding a constant power into the grid, which makes it considerably easier for a grid operator to control its grid.

That is to say that if all power fluctuations of the wind turbine or the wind farm which result from the wind fluctuation are consumed in the power-to-gas unit, this electric power which is not made available ultimately to the grid is not lost but is merely converted into another form, namely into a fuel gas, for example hydrogen, methane or the like. In other words: the power-to-gas unit is a conversion unit for converting electric power into a fuel gas.

This fuel gas can be further-processed in a variety of ways, whether it is stored or fed into a gas grid. It is also possible for the power-to-gas unit to have a controllable internal combustion engine, to which an electric generator is connected on the output side, with the result that again also electric power can be generated with fuel gas which has previously been produced and buffer-stored by the power-to-gas unit, and this electric power, when the generator is connected to the electric grid, can be fed into the grid, if this is desirable.

In order that the consumption of the power-to-gas unit can be controlled in a desirable manner, the power-to-gas unit can be connected to the wind farm or the wind turbine also over a data line.

Wind forecast data, for example from a weather control center, weather station or the like, are now processed in the wind turbine or in the wind farm, and a power forecast is established on the basis of these wind forecast data.

If, for example, there is a wind forecast in accordance with which the wind fluctuates constantly between 6 and 8 m/s for the next 30 minutes, i.e., in accordance with the forecast the wind does not fall below 6 m/s or else does not exceed 8 m/s, a reliable forecast can be established, for example, in accordance with which electric power which, using the power curve of the wind turbine or the wind farm as a basis, corresponds to an electric power which is possible in the case of, for example, 6 m/s or, if a certain safety margin is desired, in the case of, for example, a wind speed of 5.7 m/s, can safely be generated for the next 30 minutes.

This forecast value is determined as the forecast power, and this value can also be transmitted over the data line to the power-to-gas station and/or to a controller or control center for controlling the electric grid.

During operation of the wind turbine or the wind farm, the present power predetermined in each case by the wind is now continuously also detected.

If, for example, a constant forecast power for a predetermined time period, for example 30 minutes, has been established on the basis of a wind speed of 5.7 m per second and the present wind speed is at 7.7 m per second, the differential absolute value is therefore 2 m/s electric power equivalent, the electric power which is at present made available to the power-to-gas unit, this power is therefore also retrieved there as consumption.

Since the present output power of the wind turbine or of the wind farm is detected constantly, the power which is above the forecast power can also correspondingly be supplied as a value constantly to the power-to-gas unit, i.e., the electric power generated by the wind turbine/the wind farm beyond the forecast can be supplied to the power-to-gas unit, and said power-to-gas unit is correspondingly controlled in such a way that it consumes the electric power which is no longer available to the consumers in the grid but is intended to be consumed in the power-to-gas unit in order that the unit comprising the wind turbine or wind farm, on the one hand, and the power-to-gas unit, on the other hand, feeds a virtually constant electric power into the grid, from the point of view of the grid.

In a data processing device of the wind turbine or the wind farm, therefore, new forecast powers for predetermined (new) forecast time periods are determined continuously again and again and, when a forecast time period has elapsed, the operation is continued with a follow-on forecast time period in which the power is then reset corresponding to the present wind forecast.

It is also possible for the forecast time period itself to be changed depending on the presence of the wind forecast data, for example from 30 minutes to 20 minutes or from 30 minutes to 40 minutes, depending on how reliable the forecast data which are made available are.

A wind turbine is electrically connected to the power-to-gas unit. In the exemplary embodiment, the electrical connection comprises an electrical line which can equally also be embodied as part of an electric grid.

As described, a power-to-gas unit is capable of generating gas from electric current, for example hydrogen or methane or the like, i.e., a gas which is suitable for combustion, but primarily also as a fuel for an engine. Large items of equipment, for example cranes, trucks etc., are required in any case for the installation of wind turbines or wind farms, which items of equipment have until now generally been operated on diesel, gasoline or the like. If such items of equipment are now converted for the combustion of gas, for example $CH_4$ (methane), the gas which is generated by the power-to-gas unit can also be used for driving the items of equipment used to erect a wind turbine.

If, for example, a wind turbine is erected in a remote area, the electrical energy which is generated by the first wind turbine can be used in a power-to-gas unit for generating the gas with the result that the other wind turbines in the wind farm are erected using the gas by virtue of the gas being made available to the items of drive equipment, i.e., cranes, trucks, vehicles etc. which are required for erecting the wind turbines of a wind farm. Therefore, the wind farm would not require any fossil fuels for its erection, but could be erected using "green gas", i.e., for example, wind gas of the described type, which overall improves the ecobalance of the wind farm. It is precisely in remote areas that it is frequently inconvenient, often difficult, in any case to obtain fuels, and therefore the fuels themselves are also very expensive and, owing to the generation of fuel in situ, to this extent the costs for obtaining fuels which are required for the items of equipment for erecting a wind farm can be reduced. If the power-to-gas unit is then accommodated in a container or the like, once the wind farm has been erected the container with the power-to-gas unit can be transported to the next site.

BRIEF DESCRIPTION OF THE SEVERAL VIEWS OF THE DRAWINGS

The invention will be explained in more detail below with reference to an exemplary embodiment.

DETAILED DESCRIPTION

Identical reference symbols can denote identical or else similar, non-identical elements below. For reasons of completeness, a wind turbine comprising a synchronous generator and having a gearless concept with a full converter will be explained below.

Figure 1:
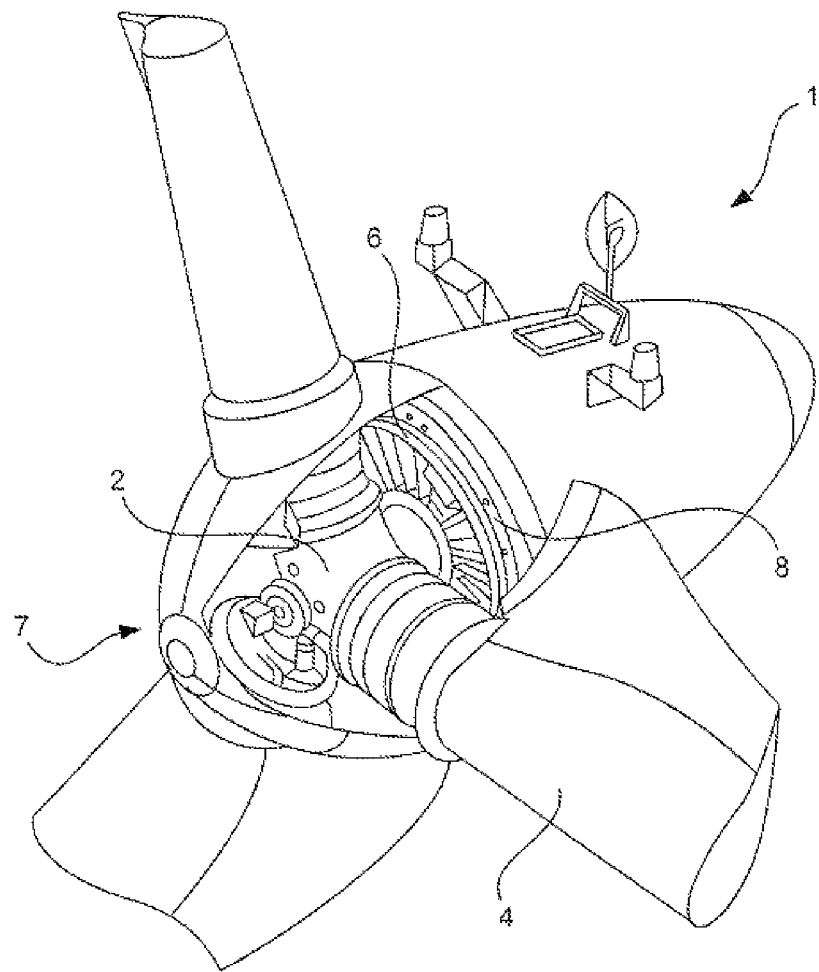
FIG. 1 shows a schematic view of a wind turbine.

FIG. 1 shows, schematically, a wind turbine 1. In particular, a pod of a gearless wind turbine is shown as an example. The hub 2 is recognizable from the spinner which is illustrated as being partially open. Three rotor blades 4 are fastened at the hub 2, wherein the rotor blades 4 are only illustrated in their region close to the hub. The hub 2 with the rotor blades 4 forms an aerodynamic rotor 7. The hub 2 is fixedly connected mechanically to the rotor 6 of the generator, which can also be referred to as armature 6 and is referred to as armature 6 below. The armature 6 is mounted rotatably with respect to the stator 8.

The armature 6 is energized during its rotation relative to the stator 8, generally with a direct current, in order thus to generate a magnetic field and to build up a generator torque or generator countertorque, which can also be set and changed correspondingly by this field current. If the armature 6 is thus electrically excited, its rotation with respect to the stator 8 generates an electrical field in the stator 8 and thus an alternating electric current.

One or more of embodiments of the invention can be implemented not only with a gearless wind turbine, but also with a gearable wind turbine.

Figure 2:
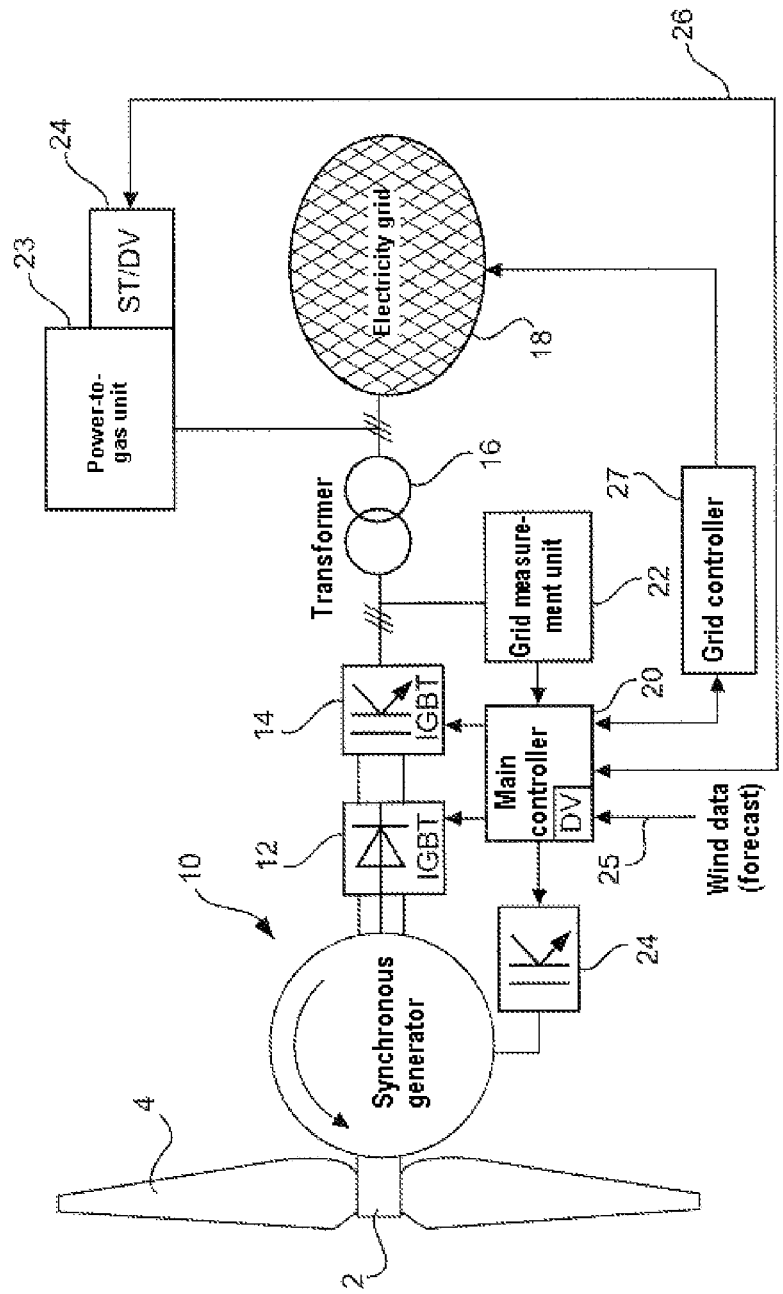
FIG. 2 shows, schematically, an overview of a wind turbine and a power-to-gas unit in accordance with an embodiment of the invention.

FIG. 2 shows, schematically, an overview of a wind turbine and a power-to-gas unit in accordance with an embodiment of the invention. In particular, said figure shows an overview with a gearless rotor-generator coupling with frequency measurement in a wind turbine with a power-to-gas unit connected thereto.

The alternating current generated in the generator 10, which substantially comprises the armature 6 and the stator 8, is rectified via a rectifier 12 in accordance with the design shown in FIG. 2. The rectified current or the rectified voltage is then converted into a three-phase system with a desired frequency with the aid of an inverter 14. The three-phase current-voltage system thus generated is in particular stepped up in terms of the voltage by means of a transformer 16 in order to be fed into a connected electricity grid 18. Theoretically, it would also be possible to dispense with the transformer 16 or to replace this transformer with an inductor. Generally, the demands for voltage in the electricity grid 18 are such that stepping up by means of a transformer 16 is necessary, however.

A main controller 20, which is also referred to as main control unit and can form the highest-order regulation and control unit of the wind turbine, is used for control purposes. The main controller 20 receives its information inter alia relating to the mains frequency (but also mains voltage, phase angle, for example) from the subordinate grid measurement unit 22. The main controller 20 controls the inverter 14 and the rectifier 12. In principle, it would naturally also be possible for an uncontrolled rectifier to be used. In addition, the main controller 20 can control a DC-to-DC converter 24 for feeding the field current into the armature 6, which is part of the generator 10. The main controller 20 inter alia modifies the feed or the working point of the generator 10 in the event that a predetermined mains frequency limit value is undershot. Since the generator 10 is operated at a variable rotation speed, the feed into the grid is performed, as described, by a full converter, which is substantially formed by the rectifier 12 and the inverter 14.

During operation, the mains voltage and the mains frequency of the grid measurement unit 22 are measured permanently on three phases. In any case in the case of a mains frequency of 50 Hz, every 3.3 m/s a new value for one of the three phase voltages results from the measurement. The mains frequency is thus detected, filtered and compared with preset limit values for every voltage half-cycle. For a 60 Hz system, a value for one of the three phase voltages would be available approximately for every 2.7 m/s, namely approximately at each zero crossing.

FIG. 2 also illustrates that the wind turbine 1 is electrically connected to a power-to-gas unit 23. The power-to-gas unit 23 can be connected downstream of the transformer 16 (or alternatively upstream thereof).

Such a power-to-gas unit 23 (conversion unit for converting electrical power into a combustible gas) as such is already known in various forms, for example from WO 2009/065577 as well. Such a power-to-gas unit 23 is also known from the company SolarFuel (www.SolarFuel.de) and is illustrated schematically in FIG. 3. It is initially possible to generate hydrogen using such a power-to-gas unit 23, for example by means of electrolysis, for which purpose electric power is drawn from a wind turbine 1, a solar source or a biomass source (with electrical generation). The power-to-gas unit 23 can also have a methanization unit, which uses the generated hydrogen, using a $CO_2$ source, to produce methane gas ($CH_4$). The gas generated, whether it be hydrogen or methane, can be passed to a gas storage facility or fed into a gas pipeline grid, for example a natural gas grid.

Finally, the power-to-gas unit 23 can also have a controller 24, which is connected to the main controller 20 of the wind turbine via a communications line 26, whether this be a wired connection, for example waveguides, or a wireless connection.

For the electrolysis in the power-to-gas unit 23, direct current is required which can be generated by means of a rectifier which is connected to the electric grid 18, for example, which converts an electric power from the grid 18 into a direct current and therefore makes electric power available to the electrolysis device of the power-to-gas unit 23. In this case, the rectifier can comprise, for example, IGBT (Insulated-Gate Bipolar Transistor) switches, thyristors or diodes and has a control unit. The switches are generally controlled in order to generate a direct current from the alternating current which is drawn from the grid 18.

The power-to-gas unit is a unit 23 in which electrical energy or power is consumed in order ultimately to produce the gas (fuel gas).

Figure 3:
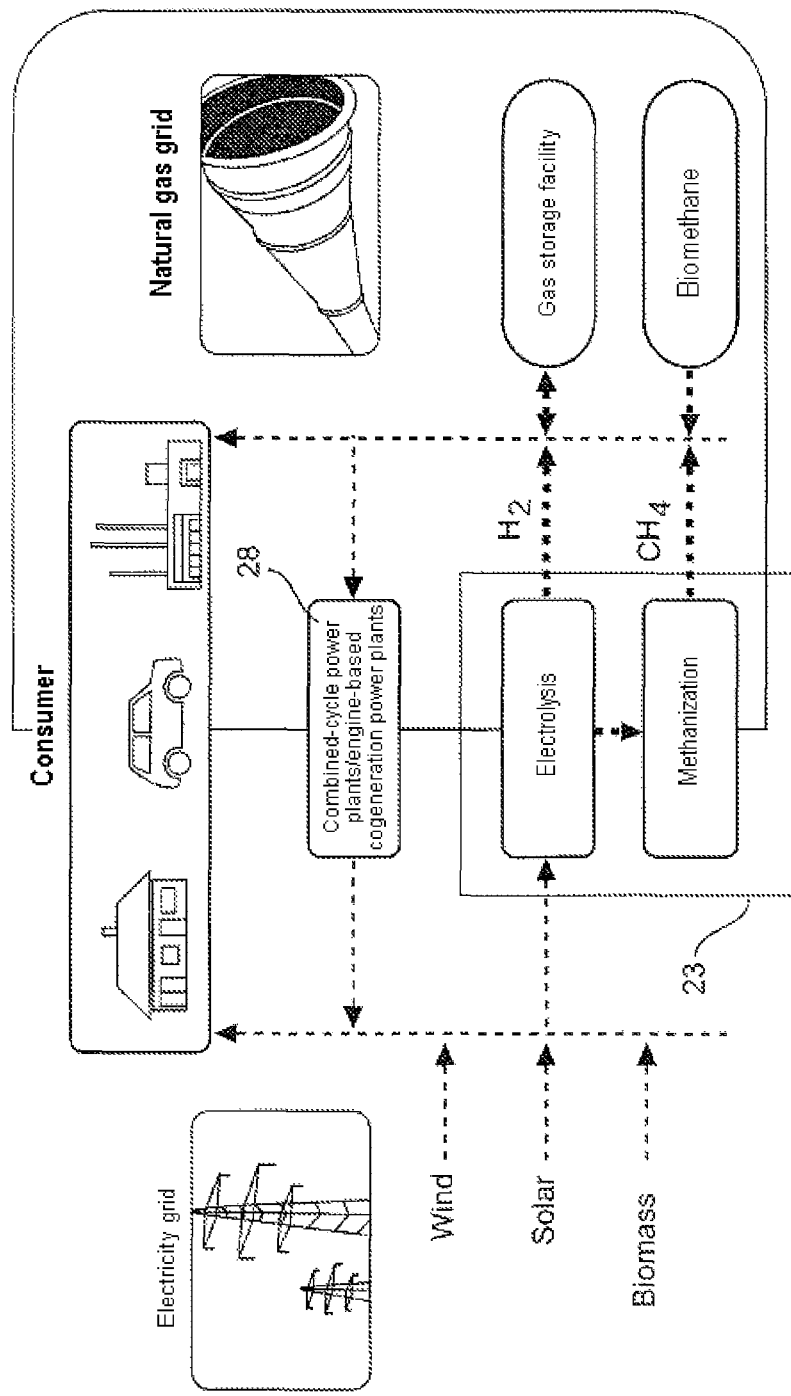
FIG. 3 shows a schematic illustration of an electricity grid, a natural gas grid and consumers.

FIG. 3 shows a schematic illustration of an electricity grid, a natural gas grid and consumers. In the example illustrated, a combined-cycle power plant or an engine-based cogeneration power plant 28 is also formed in which the combustion gas is combusted in an internal combustion engine such that, in turn, electric power can be generated in an electric generator connected to the internal combustion engine, which electric power can then again be made available to the electric grid.

The wind turbine 1 can be an individual installation, but it can also be representative of a wind farm comprising a multiplicity of wind turbines.

The wind turbine has the main controller 20 with a data processing device DV. This data processing device DV has, inter alia, a data input 25, via which wind forecast data are made available to the data processing device DV. The data processing device DV produces a power forecast from the wind forecast data for a predetermined forecast time period, for example 20, 30, 40, 50 or 60 minutes or longer, and can also very reliably determine a forecast power, i.e., a minimum electric power, which can ultimately be made available to the grid reliably in the selected forecast time period safely and constantly, on the basis of the power forecast produced owing to the processing of the power curve, illustrated by way of example in FIG. 5, of the wind turbine 1 or the wind farm.

At the same time, the wind turbine 1 or the wind farm presently determines afresh, for example at intervals of 5 to 10 seconds (or shorter), the present electric power of the wind turbine 1, which is dependent on the present wind.

The values of the present power of the wind energy which in this case is above the forecast power (minimum power) are supplied, for example, as information, data, signal etc. to the control and data processing device 24 of the power-to-gas unit 23, with the result that the electrical consumption is predetermined for the power-to-gas unit 23.

If, therefore, for example, in the wind turbine 1 or in the wind farm a forecast power of 1 megawatt (MW) has been established, but the wind turbine 1 or the wind farm is at present generating a power of 1.3 MW, the differential absolute value, i.e., 300 kW, is determined as a value and the control and data processing device 24 of the power-to-gas unit 23 receives this value as control value, with the result that, correspondingly, the power-to-gas unit 23 is then operated with a consumption of 300 kW.

If the wind decreases slightly and subsequently a present power of only 1.2 MW now results, the electrical consumption of the power-to-gas unit 23 also decreases correspondingly to 200 kW; if the wind increases such that the wind turbine or the wind farm generates 1.4 MW, the consumption of the power-to-gas unit increases correspondingly to 400 kW, etc.

Before the forecast time period has elapsed, a new forecast is produced and, in turn, a new constant power (new forecast power) is established for this new forecast time period, with the result that, if at all, the forecast power changes in the event of a transition from one forecast time period to the next forecast time period.

By virtue of the common communication line 26 between the main controller 20 of the wind turbine 1 or the wind farm, on the one hand, and the control and data processing device 24 of the power-to-gas unit on the other hand, it is also possible for present wind data or the data relating to the consumption power of the power-to-gas unit to be interchanged in order to thus ensure the constant provision of the constant minimum power fed into the electricity grid 18.

Moreover, the main controller 20 can additionally also be connected to a controller 27 or a control center for controlling the electric grid of the electricity grid, with the result that the value of the constant electric feed into the electric grid can be retrieved there or is present there.

If the present wind speed and therefore the present generated electric power of the wind turbine 1 or the wind farm falls below the forecast power, the electrical consumption of the power-to-gas unit will be driven to "zero" (or to a very low value) and at the same time possibly a combined-cycle power plant or engine-based cogenerated power plant 28 can be started up in order to additionally make available electric power which cannot be made available by the wind turbine 1 or the wind farm, with the result that the forecast electric power can still reliably be made available to the electricity grid, and if required even more than the forecast electric power by virtue of, correspondingly, the combined-cycle power plant/engine-based cogenerated power plant being operated at a higher power than is necessary.

Figure 4:
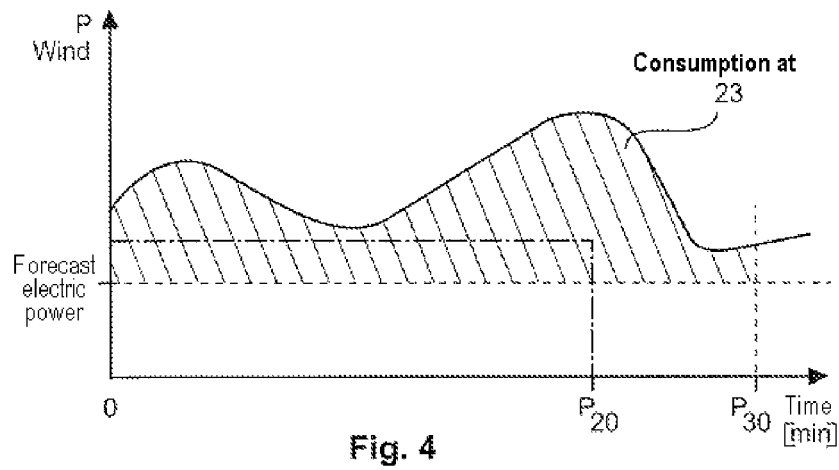
FIG. 4 shows a schematic illustration of the method according to an embodiment of the invention for operating a wind turbine or a power-to-gas unit in an exemplary overview.

FIG. 4 shows a schematic illustration of the method according to one embodiment of the invention for operating a wind turbine 1 or a power-to-gas unit 23 in an exemplary overview and in particular how the power inputs by the wind turbine 1 can be distributed.

In the exemplary overview shown in FIG. 4, the power which is generated by the wind turbine 1 over 30 minutes is shown and it is assumed, for simplification purposes, that the generated power corresponds exactly to that which has also been predicted by the forecast.

On the basis of the forecast, a predetermined forecast electric power has been established. This forecast electric power is also generated by the wind turbine 1 during the entire forecast time period and is made available to the electricity grid 18 as constant power.

Owing to the fluctuations in the wind within the forecast time period, the wind turbine 1 generates an electric power which is higher than the forecast electric power, however, and therefore the power of the wind turbine 1 which is above the forecast electric power is consumed in the power-to-gas unit 23, with the result that, during the entire forecast time period, the electric power fed into the electricity grid 18 by the wind turbine can be kept constant.

It goes without saying that, precisely in the example shown, the forecast power can also be set higher, for example if a shorter forecast time period, for example 20 minutes P20, is selected, with the result that, in this case, a higher forecast electric power can be set in accordance with the dash-dotted line.

Whether ultimately a higher forecast electric power P20 or a lower forecast power P30 is set is critically also dependent on what demand is predetermined by the grid controller 27.

That is to say that if a longer forecast time period is demanded, as in the example illustrated when a 30 minute forecast time period is demanded, only a relatively low reliable forecast electric power can be set. If, on the other hand, a constant forecast power which is as high as possible is demanded, and the forecast time period can be shortened in this case, this can also be realized by establishing the forecast power P20.

Figure 5:
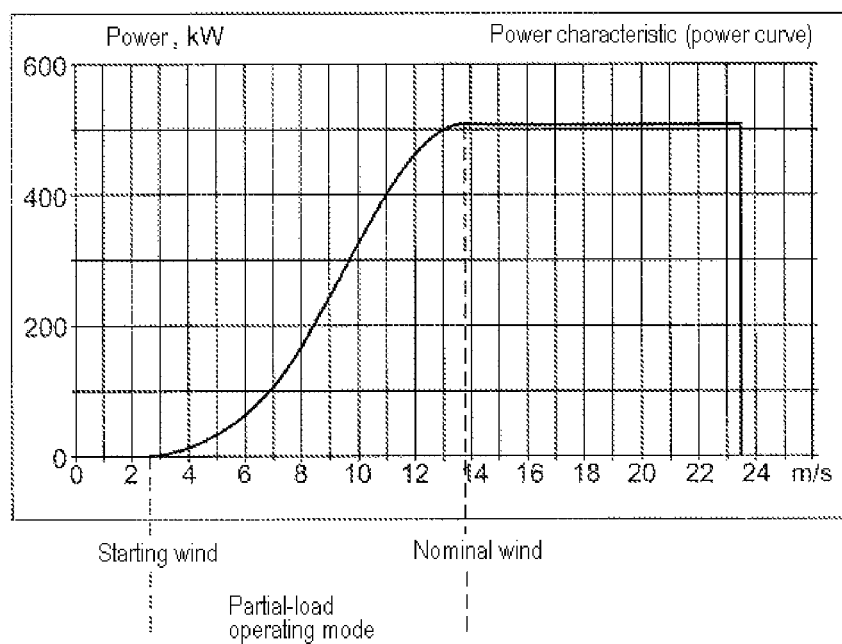
FIG. 5 shows a power curve for a wind turbine.

FIG. 5 shows, as illustrated, a typical power characteristic (power curve) of a wind turbine 1. The wind turbine 1 starts with the power generation when the starting wind is reached, approximately 3 m/s in the example. As the wind speed continues to increase, the wind turbine 1 is then in the so-called "partial-load operating mode" until the nominal wind speed, for example approximately 13.5 m/s, is reached. At wind speeds above the nominal operating mode, the wind turbine is in the nominal operating mode, i.e., generates its maximum electric power.

The partial-load operating mode is of particular interest because, in this operating mode, the electric power generated is dependent on the wind speed and when the wind fluctuates over a certain time period, the electric power generated by the wind turbine 1 or the wind farm also fluctuates. It is also possible for the power-to-gas unit 23 to be controlled directly by the grid controller 27 by a corresponding control line, for example in order to preset the electric power drawn and therefore consumed in the power-to-gas unit 23.

One embodiment of the invention relates to a method for controlling a wind turbine or a wind farm and a power-to-gas unit. If the wind turbine generates more energy than it can feed into the supply grid at that time, this excess energy can then be used to supply electrical energy to the power-to-gas unit, which is then used for converting or generating fuel gas. In addition, on the basis of a wind forecast, a forecast can likewise be determined in respect of the estimated achievable electric power of the wind turbine or the wind farm. If, however, during the forecast time period there is more wind available than originally forecast, the electric power additionally generated by the wind turbine owing to the higher wind speed can then not be fed into the supply grid, for example, but is transmitted to the power-to-gas unit, which uses the electrical energy in order to generate a fuel gas.

In accordance with one aspect of the present invention, for the case where the wind turbine is operated in a partial-load operating mode (i.e., the wind speed is greater than the starting wind speed but lower than the nominal wind speed), that electric power which has been produced beyond the forecast electric power can be transmitted to the power-to-gas unit.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a wind turbine in a wind farm comprising a multiplicity of wind turbines, the wind turbine electrically coupled to a power-to-gas unit and an electric grid, the method comprising:
    generating electric power in response to wind rotating a rotor of the wind turbine, wherein electric power starts being generated by the wind turbine when a first wind speed has been reached, wherein the wind turbine is in a partial-load operating mode when the wind speed is between the first wind speed and a second wind speed, and wherein the wind turbine is in a nominal power range when the wind speed is greater than the second wind speed;
    when the wind turbine is in the nominal power range, providing a first portion of the electric power generated by the wind turbine to the power-to-gas unit that is configured to convert a predetermined proportion of the electric power into a combustible gas and a second portion of the electric power to the electric grid;
    when the wind turbine is in the partial-load operating mode, providing the electric power generated by the wind power turbine to the electric grid for a predetermined time segment the electric power being provided is constant over time;
    determining wind forecast data for a predetermined time period that includes a forecasted power value indicative of an estimated power to be generated when the wind turbine is in the nominal power range; and
    using the wind forecast data to identify the first portion of the electric power to be provided to the power-to-gas unit.

2. The method as claimed in claim 1, wherein the wind turbine is electrically coupled to the power-to-gas unit via a data communication device, and at least one of wind speed data and wind forecast data is transmitted from the wind turbine to the power-to-gas unit for controlling the power-to-gas unit.

3. The method as claimed in claim 1, wherein the wind turbine and the power-to-gas unit are arranged within a distance of 500 m to 20 km from each other.

4. The method as claimed in claim 1, further comprising transmitting data relating to the predetermined time period from the wind turbine to a data control center for controlling the electric grid.

5. The method as claimed in claim 2, wherein controlling the power-to-gas unit is dependent on predictions and present wind conditions.

6. The method as claimed in claim 1, further comprising:
    repeatedly determining a difference between the power being generated based on the wind of the wind turbine and the forecasted power value and
    transmitting a differential absolute value as control signal to the power-to-gas unit, wherein the differential absolute value is processed for controlling the power-to-gas unit so that the first portion of the electric power corresponds to the determined differential absolute value.

7. The method as claimed in claim 1, wherein the predetermined time period is between 10 min and 1 hour.

8. The method as claimed in claim 6,
    wherein the wind turbine has a data input that is connected to a data processing system,
    wherein the data input is connected to a controller or control center, the method further comprising controlling the electric grid and determining a new value that replaces the determined differential absolute value, and the new value is transmitted to the controller or control center for controlling the electric grid over a data line.

9. The method as claimed in claim 1, wherein the power-to-gas unit has an internal combustion engine configured to receive gas generated by the power-to-gas unit, wherein a generator is connected downstream of the engine and can be used to generate electric energy or power which can be fed into the connected electric grid, and the internal combustion engine or the connected generator generates electric power if the generated power of the wind turbine or the wind farm remains below the forecast power for a predetermined time period.

10. A combined-cycle power plant comprising:
    a wind turbine in a wind farm, the wind turbine being configured to generate electric power in response to wind rotating a rotor of the wind turbine, wherein the wind turbine is in a partial-load operating mode when a wind speed is between a first wind speed and a second wind speed, and wherein the wind turbine is in a nominal power range when the wind speed is greater than the second wind speed;
    an electric grid connected electrically to the wind turbine and configured to receive a first portion of the electric power generated by the wind turbine, the first portion being constant in relation to time when the wind turbine is in the partial-load operating mode; and
    a power-to-gas unit connected electrically to the wind turbine and configured to receive a second portion of the electric power generated by the wind turned and convert the electric power into a gas.

11. The combined-cycle power plant as claimed in claim 10, wherein the gas is one of hydrogen and methane.

12. The combined-cycle power plant as claimed in claim 10, further comprising a data processing device connected electrically to the wind turbine and configured to forecast a wind speed in an environment of the wind turbine for a predetermined time period.

13. The combined-cycle power plant as claimed in claim 12, wherein the forecasted wind speed is used to determine the first portion of the electric power received by the electric grid and the second portion of the electric power received by the power-to-gas unit.

14. The combined-cycle power plant as claimed in claim 12, wherein the predetermined time period is between 10 min and 1 hour.

15. The combined-cycle power plant as claimed in claim 12, further comprising a data communication device that is coupled to the wind turbine and to the power-to-gas unit, the data communication device being configured to provide at least one of wind speed data and wind forecast data to the power-to-gas unit based on data received from the wind power installation.

16. The combined-cycle power plant as claimed in claim 12, wherein the wind turbine and the power-to-gas unit are arranged within a distance of 500 m to 20 km from each other.

* * * * *